United States Patent
Bui et al.

(10) Patent No.: US 8,135,101 B2
(45) Date of Patent: Mar. 13, 2012

(54) DATA EQUALISATION IN A COMMUNICATION RECEIVER WTH TRANSMIT AND RECEIVE DIVERSITY

(75) Inventors: Thanh Bui, Tokyo (JP); Allen Yuan, Tokyo (JP); Holly He, Tokyo (JP); Tao Lin, Tokyo (JP)

(73) Assignee: NEC Corporation, Tokyo (JP)

( * ) Notice: Subject to any disclaimer, the term of this patent is extended or adjusted under 35 U.S.C. 154(b) by 447 days.

(21) Appl. No.: 12/520,996

(22) PCT Filed: Dec. 12, 2007

(86) PCT No.: PCT/JP2007/074360
§ 371 (c)(1),
(2), (4) Date: Jun. 24, 2009

(87) PCT Pub. No.: WO2008/081715
PCT Pub. Date: Jul. 10, 2008

(65) Prior Publication Data
US 2009/0323774 A1    Dec. 31, 2009

(30) Foreign Application Priority Data
Dec. 28, 2006 (AU) .................................. 2006907315

(51) Int. Cl.
*H04B 1/00* (2006.01)
(52) U.S. Cl. ........................ 375/350; 375/147; 375/267
(58) Field of Classification Search .......... 375/141–144, 375/147, 148, 229, 260, 267, 284, 285, 346, 375/349, 350
See application file for complete search history.

(56) References Cited

U.S. PATENT DOCUMENTS

| | | | |
|---|---|---|---|
| 7,492,815 B2 * | 2/2009 | Guo et al. | 375/229 |
| 8,036,295 B2 * | 10/2011 | Yoshida | 375/267 |
| 2006/0018367 A1 | 1/2006 | Bui | |
| 2006/0291581 A1 * | 12/2006 | Onggosanusi et al. | 375/267 |
| 2010/0111157 A1 * | 5/2010 | Sawai | 375/232 |

FOREIGN PATENT DOCUMENTS

| | | |
|---|---|---|
| WO | 97/41647 | 11/1997 |
| WO | 02/060082 | 8/2002 |
| WO | 03/047032 | 6/2003 |
| WO | 2006/016722 | 2/2006 |

OTHER PUBLICATIONS

International Search Report—PCT/JP2007/074360—Mar. 11, 2008.
Karimi H R et al.—Efficient Multi-Rate Multi-User Detection for the Asynchronous WCDMA Uplink, 1999 IEEE 50th Vehicular Technology Conference, Sep. 22, 1999, vol. 1, pp. 593-597.

* cited by examiner

*Primary Examiner* — Dac Ha
(74) *Attorney, Agent, or Firm* — Young & Thompson

(57) ABSTRACT

A method of performing data equalization in a communication receiver with transmit and receive diversity includes (a) for each i-th receiver antenna and j-th transmitter antenna, calculating a channel response matrix $H_{i,j}$ from multi-path channel estimates, (b) each i-th receiver antenna, calculating a channel gain matrix $G_i$ from the channel response matrices $H_{i,j}$ and a scalar noise factor $\beta$, (c) calculating the middle column $c_0$ of $G_i^{-1}$, (d) calculating a filter coefficient vector $w_{i,j}$ from the middle column $c_0$ of $G_i^{-1}$ of and the Hermitian transpose $H_{i,j}^H$ of the corresponding channel response matrices $H_{i,j}$, (e) filtering input data $r_i$ received at each i-th receiver antenna with the corresponding filter coefficient vectors $w_{i,j}$, (f) despreading the filtered input data from each i-th receiver antenna, (g) applying phase compensation to the despread data, and (h) combining the despread data from all antennas to obtain received equalized data.

8 Claims, 3 Drawing Sheets

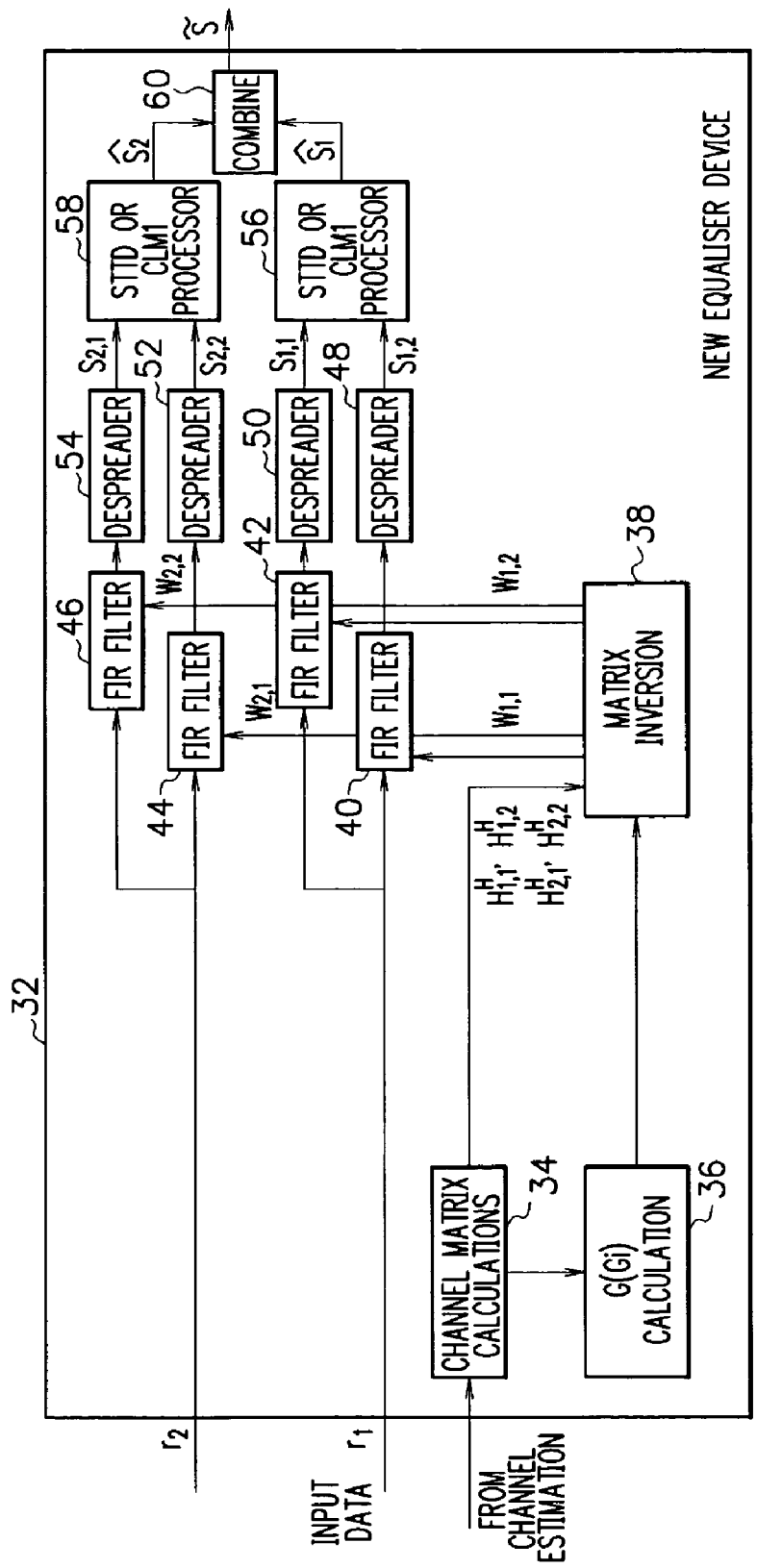
F I G. 2

MATRIX INVERSION

DATA EQUALISATION IN A COMMUNICATION RECEIVER WTH TRANSMIT AND RECEIVE DIVERSITY

The present invention relates generally to spread spectrum receivers, and in particular to methods of optimizing the equalization in a communication receiver, with transmit and receive diversity, of a spread spectrum signal transmitted through multiple resolvable fading paths channel. The invention is suitable for use in applications involving W-CDMA transmission techniques, and it will be convenient to describe the invention in relation to that exemplary application.

In W-CDMA communication systems, multicode signals at the transmitter are orthogonal to each other. However, this orthogonality is lost as the signals propagate through a multi-path fading channel. A chip equalizer is employed in the W-CDMA receiver as a means to restore the orthogonality of the signal, and thereby improve the receiver performance.

Typically, implementations of chip equalizers include a finite impulse response (FIR) filter. The chip equalizer tries to compensate for multi-path interference by inverting the channel. A known method for computing optimal chip equalizer filter coefficients uses a direct inversion matrix method involving estimation of the channel gain matrix G from the expression $G=H^H H+\beta I$, where $H^H H$ is the channel correlation matrix, I is identity matrix, and $\beta$ is a scalar noise factor in a W-CDMA system. Chip level equalization based on the matrix inversion method requires extensive computation that involves matrix decomposition as well as backward and forward substitution.

In current 3rd generation partnership project (3GPP) standards, receive diversity is used to improve receiver downlink performance. Receive diversity uses multiple antennas at the receiver to enable stronger signal reception This translates to higher data rates and increases system capacity. Current 3GPP standards specify requirements for receivers based on a least minimum mean-square error (LMMSE) chip level equalizer (CLFE). Whilst implementation of the CLE is straightforward in the case of a communication system without transmit or receive diversity, implementation of the CLE in a communication receiver with transmit and receive diversity has yet to be implemented in a practical, computationally efficient manner.

There currently exists a need to provide a method of performing data equalization in a communication receiver with transmit and receive diversity that ameliorates or overcomes one or more disadvantages of the prior art. There also exists a need to provide a method of performing data equalization in a communication receiver with transmit and receive diversity that optimizes the performance of a chip level equalizer in the communication receiver. There further exists a need to provide a method for performing data equalization in a communication receiver with transmit and receive diversity that is simple, practical and computationally efficient to implement.

With this in mind, one aspect of the invention provides a method for performing data equalization in a communication receiver, the communication receiver forming part of a communication system with transmit and receive diversity, the method including the steps of:

(a) for each i-th receiver antenna and j-th transmitter antenna, calculating a channel response matrix $H_{i,j}$ from multi-path channel estimates;

(b) each i-th receiver antenna, calculating a channel gain matrix $G_i$ from the channel response matrices $H_{i,j}$ and a scalar noise factor $\beta$;

(c) calculating the middle column $c_0$ of the inverse $G_i^{-1}$ of the channel gain matrix $G_i$;

(d) calculating a filter coefficient vector $w_{i,j}$ from the middle column $c_0$ of the inverse $G_i^{-1}$ of the channel gain matrix $G_i$ and the Hermitian transpose $H_{i,j}^H$ of the corresponding channel response matrices $H_{i,j}$;

(e) filtering input data $r_i$ received at each i-th receiver antenna with the corresponding filter coefficient vectors $w_{i,j}$;

(f) despreading the filtered input data from each i-th receiver antenna;

(g) applying phase compensation to the despread data; and (h) combining the despread data from all antennas to obtain received equalized data.

Preferably, step (c) includes:

(h) performing a Cholesky decomposition of each channel gain matrix $G_i$ into a lower triangular matrix L and an upper triangular matrix U;

(i) performing forward substitution on the lower triangular matrix L to calculate a column vector d; and (j) performing backward substitution on the column vector d and the Hermitian transpose $L^H$ of the lower triangular matrix L to calculate the middle column $c_0$ of the inverse $G_i^{-1}$ of the channel gain matrix $G_i$.

Preferably, the channel gain matrix $G_i$ to be inverted is calculated from the expression $$G_i = \sum_1^j \hat{H}_{i,j}^H \hat{H}_{i,j} + \tilde{\beta}_i I$$

where I is the identity matrix.

Another aspect of the invention provides a chip equalizer for use in a communication receiver forming part of a communication system with transmit and receive diversity, the chip equalizer including one or more computational blocks for carrying out the above described method.

The following description refers in more detail to various features of the invention. To facilitate an understanding of the invention, reference is made in the description to the accompanying drawings where the method for performing data equalization and the chip equalizer are illustrated in preferred embodiments. It is to be understood that the invention is not limited to the preferred embodiments as shown in the drawings.

In the drawings:

FIG. 2 is a schematic diagram showing selected functional blocks of an equalizer for use in the communications receiver forming part of the communication system of FIG. 1;

Figure 1:
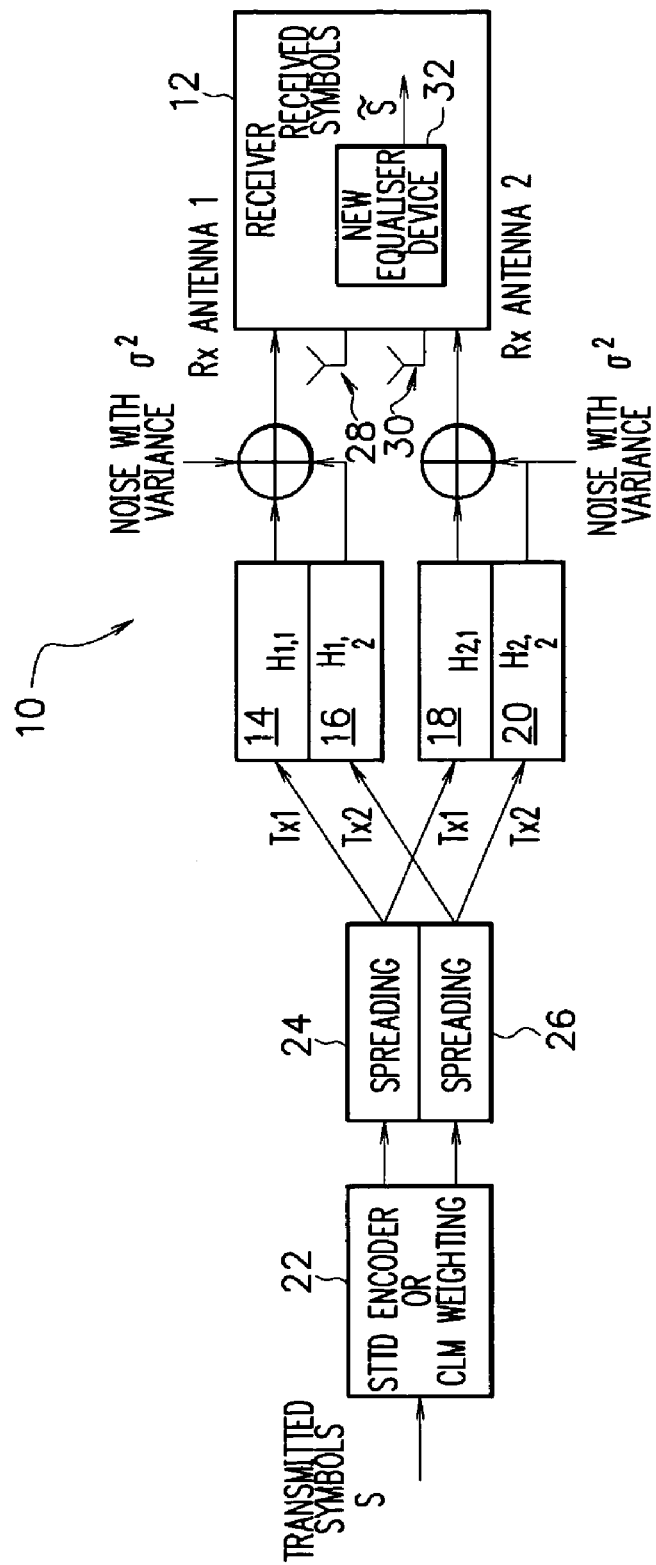
FIG. 1 is a schematic diagram of a communication system including a communication receiver with transmit and receive diversity.

Referring now to FIG. 1, there is shown generally a communication system 10 for transmission of data symbols to a communication receiver 12. The communication system 10 uses a diversity scheme to improve the reliability of a message signal transmitted to the receiver 12 by using multiple communication channels with different characteristics. In the example illustrated in this figure, four communication channels 14 to 20 are illustrated. Each of the communication channels 14 to 20 experience different levels of fading and interference.

There currently exists two different types of transmit diversity modes, namely Space Time Transmit Diversity (STTD) and Closed Loop Transmit Diversity Mode (CLM). Accordingly, space-time encoding or a CLM weighting is applied by a symbol processing block 22 to the symbols to be transmitted to the receiver 12. Space-time encoded symbols or CLM weighted symbols are provided to symbol spreaders 24 and 26.

Following spreading, the data symbols are effectively transferred to the communication receiver 12 over different propagation paths by the use of multiple reception antennas at the communication receiver 12, as well as multiple transmission antennas. In this example, two exemplary receiving antennas 28 and 30 are illustrated and two transmission antennas have been used to transmit the data symbols, but in other embodiments of the invention any number of receiving and/or transmission antennas may be used.

During transmission of the data symbols to the communication receiver 12, noise characterized by variance $\sigma^2$ is effectively introduced into the dispersive channels 14 to 20. The communications receiver 12 includes an equalizer 32 designed to restore the transmitted data signals distorted by the dispersive channels 14 to 20 and the noise introduced into those dispersive channels.

Selected computational blocks of the equalizer 32 are illustrated in FIG. 2. The equalizer 32 includes a channel response matrix calculation block 34, a direct gain matrix calculation block 36, a matrix inversion block 38, FIR filter blocks 40 to 46, despreader blocks 48 to 54, STTD or CLM processors 56 and 58 and a data symbol combining block 60. In use, the equalizer 32 receives samples $r_i$ at each of the i receiver antennas, namely samples $r_1$ from dispersive channels 14 and 16 received at the first reception antenna 28 and samples $r_2$ from dispersive channels 18 and 20 received at the second reception antenna 30.

Channel estimates for the dispersive channel received at each i-th reception antenna are computed within the receiver 12 and provided as an input to the channel matrix calculation block 34. The channel estimates $h_l^i$, where l=0, 1, 2, ..., L−1 are received by the channel matrix calculation block 34 for the L multiple resolvable fading paths of each transmission channel received by each i-th reception antenna.

The channel response matrix $\hat{H}_{i,j}$ for each i-th receiver antenna and each j-th transmitter antenna is constructed from, the received channel estimates by consecutively shifting a channel vector column, by column, where the channel vector is formed by arranging the L channel estimates $h_l^{i,j}$ in their multi-path position in the direction of the column. In the example shown in FIG. 2, four such channel matrices are constructed.

A channel gain matrix $G_i$ is then constructed for each i-th receiver based upon the estimate of the channel response matrices $H_{i,1}$ and $H_{i,2}$ together with an estimate of the scale and noise factor in the communication system 10. The channel gain matrix $G_i$ is calculated according to the following equation:

$$G = \hat{H}_{1,1}^H \hat{H}_{1,1} + \hat{H}_{1,2}^H \hat{H}_{1,2} + \hat{H}_{2,1}^H \hat{H}_{2,1} + \hat{H}_{2,2}^H \hat{H}_{2,2} + \hat{\beta} I$$

$$\text{or } G_i = \hat{H}_{i,1}^H \hat{H}_{i,1} + \hat{H}_{i,2}^H \hat{H}_{i,2} + \hat{\beta}_i I$$

where $\hat{H}_{i,1}$ and $\hat{H}_{i,2}$ are the channel response matrices for the two dispersive channels received at each i-th receiver antenna, $\hat{H}_{i,1}^H$ and $\hat{H}_{i,2}^H$ are respectively the hermitian transpose of those channel response matrices, $\hat{\beta}$ is an estimate of the noise factor of the communication system 10 and I is the identity matrix. $\hat{H}_{i,j}^H \hat{H}_{i,j}$ is the channel correlation matrix for each i-th dispersive channel in the communication system 10.

The estimate $\hat{\beta}$ of the noise factor in the communication system 10 can be computed by the receiver 12 in the manner described in United States Patent Application 2006/0018367, filed 19 Jul. 2005 in the name of NEC Corporation, the entire contents of which are incorporated herein by reference.

Figure 3:
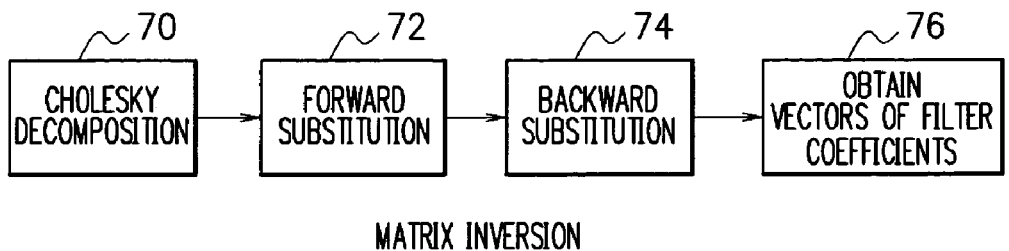
FIG. 3 is a flow chart showing a series of steps performed by a matrix inversion computational block for the equalizer shown in FIG. 2.

The channel gain matrix $G_i$ must then be inverted in the matrix inversion block 38. A computationally efficient series of steps performed by the matrix inversion block 38 are illustrated in the flow chart shown in FIG. 3. At step 70, a Cholesky decomposition of the channel gain matrix $G_i$ is performed to obtain a lower triangular matrix L and an upper triangular matrix U.

Figure 4:
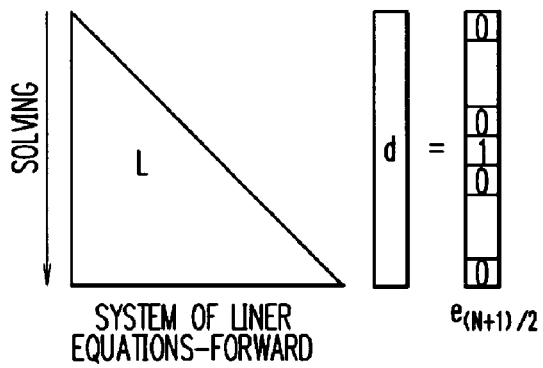
FIGS. 4 and 5 are graphical representations respectively of the forward and backward substitution steps of the filter coefficient calculation method carried out by the equalizer shown in FIG. 2.

At step 72, a forward substitution is then performed to solve the equation $$Ld = e_{(N+1)/2} = [e_1, e_2, \ldots, e_N]^T \qquad (3)$$

$$\text{where } e_i = \begin{cases} 1 & i = (N+1)/2 \\ 0 & \text{otherwise} \end{cases}$$

to obtain a column vector d. The lower triangular matrix L, the column vector d and the resultant column vector e are schematically represented in FIG. 4. Preferably, only half of this vector (denoted as $\hat{d}$ where $\hat{d}=d[(N-1)/2, \ldots, N-1]$) needs to be inputted into the next computational step.

Figure 5:
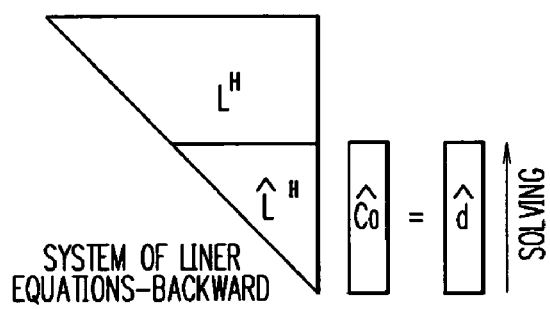

At step 74, a backward substitution is then carried out to solve the equation $$\hat{L}^H \hat{c}_0 = \hat{d}$$

where $$\hat{L}^H[i,j] = L^H[i+(N-1)/2, j+(N-1)/2]$$

$$\forall 0 \leq i,j \leq (N-1)/2$$

to obtain half of vector $c_0$ (denoted as $\hat{c}_0$) corresponding to the middle row of the matrix $G_i^{-1}$. FIG. 5 is a graphical illustration of the backward substitution step performed at this step. The full vector $c_0$ can then be obtained noting that $$c_0[(N-1)/2+k] = \hat{c}_0[k], c_0[k] = c_0[N-1-k]^*, k=0, \ldots, (N-1)/2$$

At step 76, the vectors $w_i$ of filter coefficients for each of the FIR filters 40 to 46 can be obtained by computing $w_i = c_0^H H_i^H$ for each i-th filter.

The input data $r_i$ is periodically updated with filter coefficient vectors $w_i$ during operation of the receiver 12. Despreader blocks 48 to 54 perform despreading operations on the input data symbol estimates from the multiple resolvable fading paths received respectively by the reception antennas 28 and 30. Accordingly, each despreader block obtains estimated symbols corresponding to each i-th receiver antenna and j-th transmitter antenna combination.

The STDD or CLM processors 56 and 68 then respectively act to decode the symbol estimates derived from input date received at the receiver antennas 28 and 30.

The combining block 60 acts to combine the decoded symbol estimates to obtain equalized data symbols.

Since the linear equations solved in the forward substitution step 72 and backward substitution step 74 has N and (N+1)/2 unknowns, solving them only requires calculation complexity of $O(N^2)$. This significantly reduced computational complexity and enables the use of the equalizer 32 in practical communication.

It will be appreciated from the foregoing that in a communication system, calculating the filter coefficients for an equalizer at the receiver using direct matrix inversion would normally require up to $O(N^3)$ complex multiplications for forward and backward substitutions processing, where N is dimension of the square channel matrix to be inverted. This high level of computational complexity is a prohibitive factor for this method to be used in practical communication device. The above-described equalizer uses an efficient method of calculation requiring only $0(N^2)$ complex multiplications for forward and backward substitutions processing to obtain exactly the same performance as normal equalizer employing direct matrix inversion. The simplified calculation is achievable by exploiting the special property (Hermitian and Positive Definite) of the channel response matrix G as well as the way filter coefficients are calculated in a particular realization of the equalizer receiver.

Finally, it should be appreciated that modifications and/or additions may be made to the equalizer and method of calculating filter coefficients for an equalizer without departing from the spirit or ambit of the present invention described herein.

This application is based upon and claims the benefit of priority from Australian patent application No. 2006907315, filed on Dec. 28, 2006, the disclosure of which is incorporated herein in its entirety by reference.

The invention claimed is:

1. A method for performing data equalisation in a communication receiver, the communication receiver forming part of a communication system with transmit and receive diversity, the method including the steps of:
   (a) for each i-th receiver antenna and j-th transmitter antenna, calculating a channel response matrix $H_{i,j}$ from multi-path channel estimates;
   (b) each i-th receiver antenna, calculating a channel gain matrix $G_i$ from the channel response matrices $H_{i,j}$ and a scalar noise factor β;
   (c) calculating the middle column $c_0$ of the inverse $G_i^{-1}$ of the channel gain matrix $G_i$;
   (d) calculating filter coefficient vectors $w_{i,j}$ from the middle column $c_0$ of the inverse $G_i^{-1}$ of the channel gain matrix $G_i$ and the Hermitian transpose $H_{i,j}^H$ of the corresponding channel response matrices $H_{i,j}$;
   (e) filtering input data $r_i$ received at each i-th receiver antenna with the corresponding filter coefficient vectors $w_{i,j}$;
   (f) despreading the filtered input data from each i-th receiver antenna;
   (g) applying phase compensation to the despread data; and
   (h) combining the despread data from all antennas to obtain received equalised data.

2. A method according to claim 1, wherein step (c) includes:
   (h) performing a Cholesky decomposition of each channel gain matrix $G_i$ into a lower triangular matrix L and an upper triangular matrix U;
   (i) performing forward substitution on the lower triangular matrix L to calculate a column vector d; and
   (j) performing backward substitution on the column, vector d and the Hermitian transpose $L^H$ of the lower triangular matrix L to calculate the middle column $c_0$ of the inverse $G_i^{-1}$ of the channel gain matrix $G_i$.

3. A method according to claim 1, wherein the channel gain matrix $G_i$ to be inverted is calculated from the expression $$G_i = \sum_1^j \hat{H}_{i,j}^H \hat{H}_{i,j} + \tilde{\beta}_i I$$

where I is the identity matrix.

4. A chip equaliser for use in a communication receiver forming part of a communication system with transmit and receive diversity, the chip equaliser including one or more computational blocks for carrying out a method according to claim 1.

5. A method according to claim 2, wherein the channel gain matrix $G_i$ to be inverted is calculated from the expression $$G_i = \sum_1^j \hat{H}_{i,j}^H \hat{H}_{i,j} + \tilde{\beta}_i I$$

where I is the identity matrix.

6. A chip equaliser for use in a communication receiver forming part of a communication system with transmit and receive diversity, the chip equaliser including one or more computational blocks for carrying out a method according to claim 2.

7. A chip equaliser for use in a communication receiver forming part of a communication system with transmit and receive diversity, the chip equaliser including one or more computational blocks for carrying out a method according to claim 3.

8. A chip equaliser for use in a communication receiver forming part of a communication system with transmit and receive diversity, the chip equaliser including one or more computational blocks for carrying out a method according to claim 5.

* * * * *